United States Patent [19]

Jones

[11] Patent Number: 5,540,210
[45] Date of Patent: Jul. 30, 1996

[54] ADJUSTABLE GUIDE FOR A POWER SAW

[76] Inventor: Stephen Jones, 10800 Morris Ave. South, Bloomington, Minn. 55437

[21] Appl. No.: 191,129

[22] Filed: Feb. 3, 1994

[51] Int. Cl.⁶ ........................................ B28D 1/02
[52] U.S. Cl. ........................ 125/13.01; 125/13.03
[58] Field of Search .................. 125/12, 13.01, 125/13.03; 451/353; 30/165, 166.3, 388, 389, 390

[56] References Cited

U.S. PATENT DOCUMENTS

| | | | |
|---|---|---|---|
| 239,703 | 4/1881 | Bennett | 30/374 |
| 1,204,345 | 11/1916 | Davey et al. | 30/371 |
| 1,563,844 | 12/1925 | Gerlach | 30/371 |
| 1,975,191 | 10/1934 | Calef | 30/371 |
| 3,091,851 | 6/1963 | Cummins | 30/371 |
| 3,092,156 | 6/1963 | Hayden | 30/371 |
| 3,656,468 | 4/1972 | Welden | 125/13.01 |
| 3,896,783 | 7/1975 | Manning | 125/13 R |
| 4,188,935 | 2/1980 | Tubesing | 125/13 R |

Primary Examiner—Maurina T. Rachuba
Attorney, Agent, or Firm—Evenson, McKeown, Edwards & Lenahan, P.L.L.C.

[57] ABSTRACT

A guide for use with a portable power saw has a cutting tool which revolves about an arbor in order to cut a surface. A set of wheels is coupled to the power saw. The set of wheels is arranged substantially on a line extending through the arbor. The line is perpendicular to the surface during a cutting operation. This allows for easy radius cuts to be made by the power saw without straining either the saw blade or the operator.

16 Claims, 5 Drawing Sheets

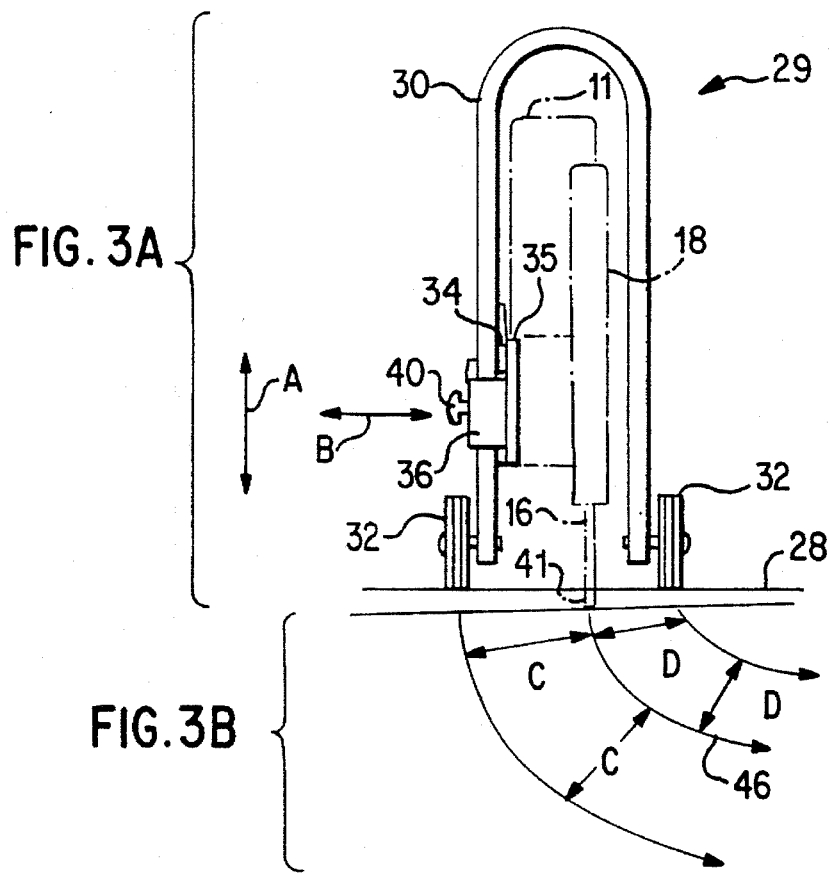
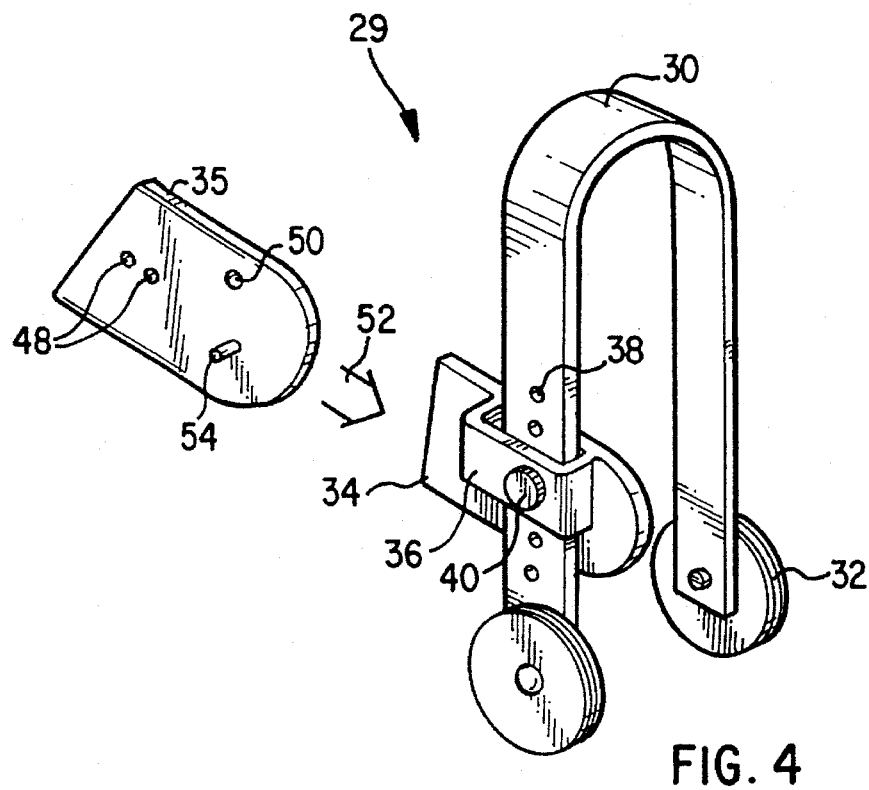
FIG. 4

ADJUSTABLE GUIDE FOR A POWER SAW

FIELD OF THE INVENTION

This invention relates to the field of power saws, such as are used for cutting concrete, stone, asphalt, steel, pavers, and the like. More particularly, the invention relates to guides, such as guide wheel sets, connected with the power saws to aid in the cutting process.

BACKGROUND OF THE INVENTION

Portable or hand-held power saws used for cutting masonry surfaces, pavements, and the like, have been known for some time. Examples of various types of power saws are described in Pat. Nos. 4,188,935, 3,896,783 and 3,656,468. Referring to prior art FIG. 1, there is shown a typical portable or hand-held power saw 10.

The typical portable power caw 10 includes an engine or motor 12 coupled to a saw body 14. Prior art FIG. 1 shows a gasoline powered engine 12, although other types of engines or motors can be used, such as a hydraulically or electrically powered motors. The engine 12 is operatively connected to a circular cutting tool such as a saw blade 16 arranged on an opposite end of the saw body 14. A blade guard 18 encloses a portion of the blade 16 and is connected to the saw body The portable power saw 10 includes two handles 20 and These handles 20 and 22 can be arranged on either side of the engine 12 so as to provide the operator with a stable hold on the power saw 10. A power switch 24 is operatively arranged on the handle 20 for switching the power saw 10 on and off. In use, the operator typically grips the handle 20 with one hand and the handle 22 with his other hand. The operator's one hand can then operate the power switch 24 while the other hand can control the engagement of the saw blade 16 with the surface 28 to be cut.

Typical portable power saws weigh on the order of 20 to 40 lbs. In use therefore, this weight strains the operator. The operator must not only physically lift the power saw in order to locate the saw blade in the proper position for a cut, but he also typically must hunch forward in order to maintain engagement between the saw blade 16 and the cutting surface during the length of the cut. Extended use of a portable power saw thus quickly exhausts an operator's strength and places a strain on his back and arms. When using a portable power saw, it is advantageous to be able to precisely control the depth of a cut because the saw blades wear down and are expensive to constantly replace, cutting a surface at a greater depth than is necessary is disadvantageous as it results in excessive wear on the blade, as well as a slower cutting process than is optimal. However, it is often difficult for the operator of the portable power saw to cut at a constant depth throughout the extent of the cut. Many times, the operator simply cuts along the entire exposed portion of the saw blade 16 in order to assure himself that a sufficient cut was made.

In order to relieve the strain on the operator, as well as to help maintain a constant cutting depth, it has been heretofore known to make use of a pair of wheels 26 mounted on the blade guard 18. These wheels 26 provide a pivot axis for moving the power saw 10 between an at rest position as shown in prior art FIG. 1 and an operational position wherein the saw blade 16 is engaged into the cutting surface 28. The use of such wheels 26, however, does not fully relieve the strain on an operator using the portable power saw 10 as he still must stoop down to perform his cut, as well as lift the saw to engage a cut.

As an alternative, commercially available saw carts have been developed. A saw cart provides a frame to which the power saw can be mounted. The saw cart includes a set of wheels arranged behind the saw blade to provide a pivot axis much like the wheel set 26 shown in prior art FIG. 1. The saw cart further includes an extended cart handle which generally allows the operator to walk upright while pushing the cart along the length of the cut. However, use of a saw cart requires a time consuming mounting process for the power saw. The assembly or mounting time, as well as the disassembly time, is particularly disadvantageous when the power saw is frequently changed between its mounted saw cart and its hand-held state. Further, when the power saw is used with the saw cart, the weight of the entire assembly greatly increases.

While use of a wheel set or saw cart helps relieve some of the operator strain, numerous disadvantages arise with respect to the cutting process. While the wheel set or the wheels of the saw cart provide an adequate guide for performing straight cuts, it is extremely difficult to perform radius or curved cuts using these devices. This is due to the fact that the pivoting axis of the wheel set is positioned behind the arbor of the saw blade, i.e., the axis of rotation of the saw blade. When a radius or curved cut is attempted, the wheels must be skidded or slid transverse to their rolling direction in order to allow the saw blade 16 to make a radius cut. The friction generated by the wheels inhibits the turning ability of the power saw and causes increased contact between the side faces of the saw blade 16 and the groove being cut. This results in a strain on the blade side face as well as excessive wear and damage to the blade. Further, the strain on the operator is increased as he attempts to skid the wheels so as to make a radius cut.

Another disadvantage with the use of the prior known wheel sets and saw carts is that the depth of the out can substantially vary due to any pivoting motion about the awls of the wheels. Because the pivot axis of the wheels, and hence the power saw, is substantially offset from the cutting point of the saw blade, i.e., the portion of the saw blade 16 which engages the cutting surface 28, even the slightest variation in the pivot angle about the wheels causes an amplified variation of the depth of the cut. In field use, this results in uneven cuts being generated along the length of the cut due to an operator's slight variation of the pivot angle of the power saw.

There is therefore needed a guide for a portable power saw which overcomes the above-mentioned problems associated with the prior art.

SUMMARY OF THE INVENTION

These needs have been met according to the present invention by providing a wheel set adaptable to a portable power saw wherein the pivot axis of the wheel set is generally located substantially along a line extending perpendicularly to the cutting surface and passing through the arbor of the saw blade when in use. In this manner, the surface contact points of both the wheels and the saw blade are substantially in-line, which allows for easy radius or curve cutting, with only minimal or no skidding of the wheel set.

It is a further advantage of the present invention that the wheel set is provided with an adjustable height setting in order that the saw blade may maintain a constant cutting depth. Because the pivot axis of the wheel set is arranged directly below the arbor of the saw blade, any operator induced pivoting of the power saw as a whole results in only minimal variations of the cutting depth.

It is a further advantage that the height adjusting mechanism can be specified for certain types of cutting surfaces. For example, interlocking pavements make use of concrete pavers that are available in standard sized dimensions, e.g., 6, 7 and 8 cm. Thus, the cutting heights of the adjustable wheel set can be set in accordance with the type of concrete paver being cut and the desired depth of the cut. By setting a proper cutting depth, excessive wear on the saw blade is eliminated, thus resulting in less downtime for the power saw as well as a savings in the cost of the saw blades.

It is yet another advantage of the present invention that the adjustable wheel set can be adapted to most available power saws. The adjustable wheel set makes use of an adaptor plate which is fitted to the body of the power saw, for example, such as by means of a bolt fastening using an available bolt location on the power saw.

The present invention makes use of a generally U-shaped support which fits over the saw blade and blade guard on the power saw. An adjusting mechanism is arranged on one leg of the U-shaped support. A set of wheels are pivotally mounted at each end of the U-shaped support. The adjusting mechanism is adapted to mount onto the adaptor plate fixed to the saw body. The adjusting mechanism can be moved along the length of the leg of the U-shaped support in order to adjust the depth of the cut.

While any fixing device can be used to adjust the position of the adjusting mechanism along the leg of the U-shaped support, a preferred embodiment makes use of a spring-loaded pin which can be locked into predefined adjusting holes on the U-shaped support.

It is yet another advantage of the present invention that the adaptor plate and U-shaped support are designed such that when the portable power saw is in its operating state, the handle of the power saw is located so as to be easily grasped by the operator without any stooping or bending being necessary. This is accomplished by providing an adaptor plate for each commercially available power saw. The adaptor plate connects to the saw body so as to maintain the desired angular relationship between the saw body and cutting surface when the wheel set is installed.

It is still a further advantage of the present invention that the guide is simple to use and install, and can be formed of light weight materials. The guide has only a minimal number of parts, thus providing easy coupling with the power saw, such as through a pin and bolt attachment. Further, the entire assembly is light weight compared with bulky saw carts.

A still further advantage of the present invention is that the positioning of the guide between the cutting surface and the arbor of the cutting tool helps to relieve torques generated by the movement of the cutting tool. This further relieves the strain on the operator.

Other objects, advantages and novel features of the present invention will become apparent from the following detailed description of the invention when considered in conjunction with the accompanying drawings.

BRIEF DESCRIPTION OF THE DRAWINGS

FIG. 3A is a front view of the present invention wherein the power saw is indicated via phantom lines;

FIG. 3B is a top view of the cutting surface indicating the relationship between the guide and the cutting tool during a radius cut;

FIG. 4 is an exploded view of the present invention illustrating the adaptor plate, U-shaped support and adjusting mechanism;

DETAILED DESCRIPTION OF THE DRAWINGS

Figure 1:
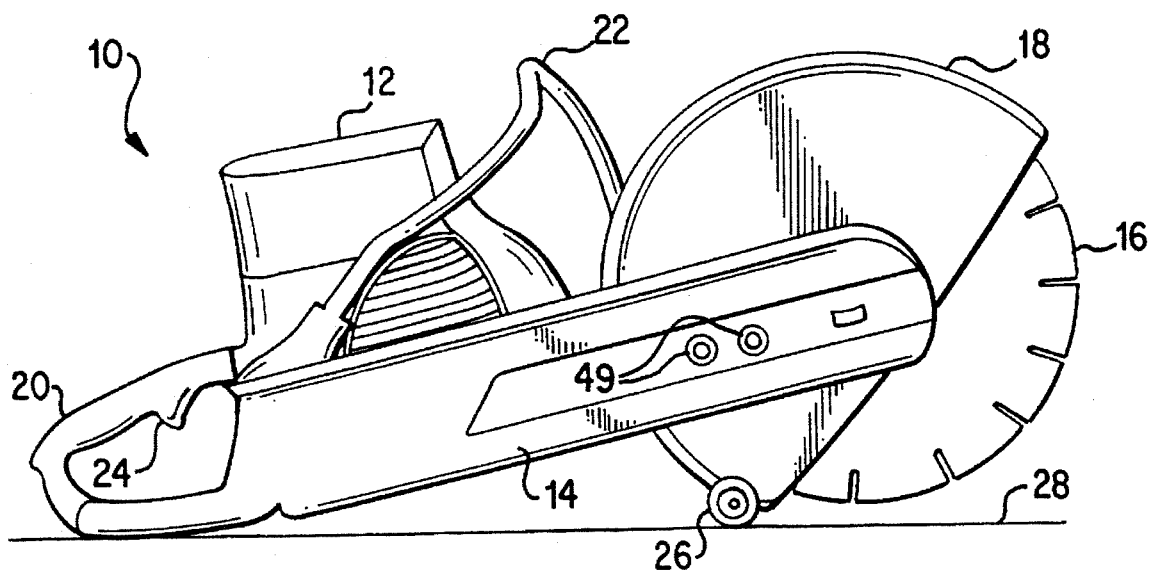
FIG. 1 is a schematic drawing of a portable power saw known in the prior art.
Figure 2:
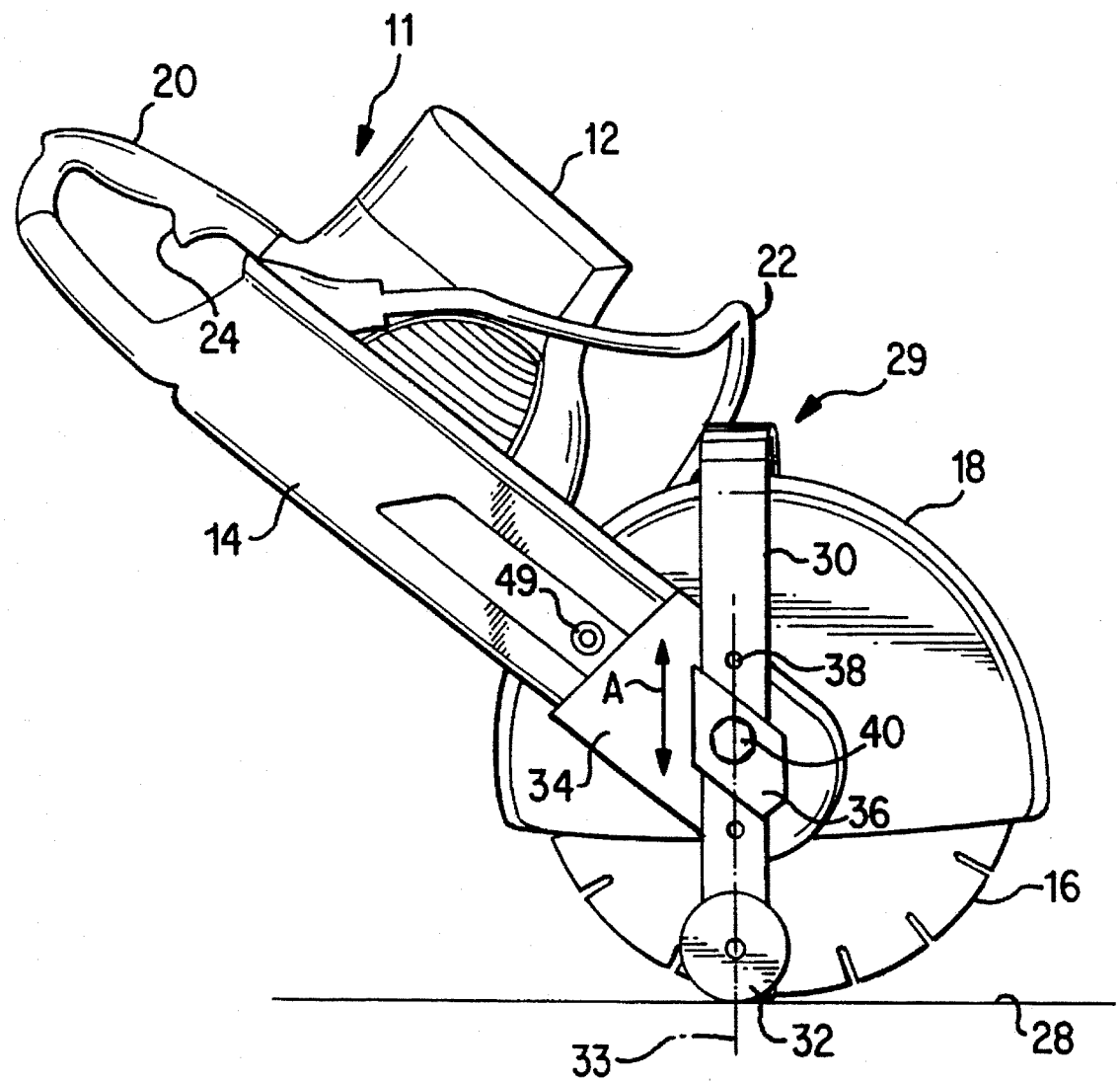
FIG. 2 is a schematic diagram of a power saw using the present invention.

Referring to FIG. 2, there is shown a portable power saw 11 using the adjustable wheel set according to the present invention. With respect to the power saw, like reference numerals have been used where the parts corresponds with those shown in prior art FIG. 1.

The power saw 11 includes an engine 12 connected to a saw body 14. A first operator handle 20 is arranged at one end of the saw body 14 and includes a power switch 24. A second operator handle 22 is arranged on the other side of the engine 12 closer to the cutting unit. At the other end of the saw body 14, opposite the handle 20, there is arranged a saw blade 16 having a blade guard 18.

An adjustable guide wheel set, indicated generally by 29, is arranged around the saw blade 16 on the saw body 14. The adjustable wheel set 29 includes a U-shaped support frame 30 having wheels 32 arranged at the ends of the U-shaped support frame 30. While the preferred embodiment makes use of a wheel set and U-shaped frame, it is to be understood that any type of guide, such as a slide pad, as well as support frame could be used without departing from the scope of the invention. For example, two separate bars could be mounted on either side of the power saw. Alternatively, large diameter guide wheels could be adjustably mounted directly to the power saw. So long as the radius of the wheels approximated that of the cutting tool, sufficient adjustability would be possible.

Referring again to FIG. 2, a height adjusting mechanism includes a mounting plate 34 which is connected to an adaptor plate (not shown in FIG. 2, see FIG. 4) that is mounted on the power saw. The mounting plate 34 is adapted to slide along a leg of the U-shaped support frame 30. In the embodiment shown in FIG. 2, the slide arrangement includes a channel forming portion 36 through which the leg of the U-shaped support frame 30 is inserted. The U-shaped support frame 30 includes several through holes 38 into which a spring-loaded pin 40 mounted on the channel forming portion 36 can lock into. In this manner, the adjusting mechanism, and hence the power saw 11, can be raised or lowered along the length of the leg of the U-shaped support frame 30. As will be apparent to those skilled in the art, other types of adjusting mechanisms can be used, such as a frictionally engaging threaded knob, without departing from the spirit and scope of the present invention.

By using the spring-loaded pin 40, the saw blade 16 can be raised or lowered along the leg of the u-shaped support frame 30 as indicated by arrow A. The height settings provided by through holes 38 can indicate the distance by which the saw blade 16 extends below the wheels 32, hence providing the cutting depth. It should be understood that in FIG. 2, the saw blade is shown in a non-cutting state as the blade 16 does not engage the cutting surface 28.

Referring to FIG. 3, there is shown a front view of the adjustable wheel set 29. The power saw 11, saw blade 16 and blade guard 18 are indicated in phantom in FIG. 3. The U-shaped support frame 30 is designed to fit over the saw blade 16 and blade guard 18. The mounting plate 34 of the adjusting mechanism is shown fixedly connected to the adaptor plate 35 which is coupled to the power saw 11. It should be readily understood by those skilled in the art that any suitable device for fixing the mounting plate 34 to the adaptor plate 35 can be used. Similarly, the means for mounting the adaptor plate 35 onto the portable power saw 11 need only be selected so as to provide a secure coupling. Again, it should be noted than the use of an adaptor plate and mounting plate are given by way of example only, it will be readily understood by those skilled in the art that alternate mounting arrangements can be used, including those wherein the adjusting mechanism mounts directly to the power saw without the need for an adaptor plate.

The adjusting mechanism includes the channel forming portion 36 through which the leg of the U-shaped frame extends. The spring-loaded pin 40 cam be moved in the direction shown by arrow B in order to slide the adjusting mechanism up or down as indicated by arrow A along the leg of the support frame 30. As shown in FIG. 3, the power saw 11 is set at an adjusting height so as to cut a groove 41 in the cutting surface 28.

FIGS. 3A and 3B further diagrammatically illustrate how the adjustable wheel set 29 enables the power saw to more easily perform a radius or curved cut. Because the wheels 32 are positioned substantially in a perpendicular line running from the cutting surface 28 through the arbor of the saw blade 16, an essentially constant spacing is maintained between the saw blade 16 and each wheel 32 during a radius cut. As shown in the top view of the cutting surface in FIG. 3B, the spacings C and D generally remain constant during the course of the radius cut indicated by arrow 46.

Referring to FIG. 4, there is shown an exploded view of the adjustable wheel set. 29. In this view, it can be seen that the adjusting mechanism couples to an adaptor plate 35 specifically designed for a particular portable power saw. The adaptor plate 35 includes mounting holes 48 which, by means of example only, can connect the adaptor plate 35 with bolt locations 49 (FIGS. 1 and 2), to secure the adaptor plate to the power saw. As noted above, various other types of mechanisms can be used to secure the adaptor plate 35 to the power saw. Similarly, the mounting plate 34 of the adjusting mechanism can connect with the adaptor plate via the bolt hole 50 and pin 54. The pin 54 mates with an attachment (not shown) located on the backside of the mounting plate 34. Again, it should be pointed out that the use of a bolt and pin arrangement is for purposes of an example only, and other widely known devices for securing two items together can be used without departing from the scope of the invention.

Arrow 52 in FIG. 4 indicates that the adaptor plate 35, when the adjusting guide wheel set is constructed, is arranged on the inner face of the mounting plate 34, between the power saw and the U-shaped support frame. Again, FIG. 4 illustrates the spring-loaded pin 40 which allows the adjusting mechanism to be secured at a specified cutting depth via the through holes 38. Of course, one skilled in the art would readily understand that other height adjusting mechanisms such as a frictionally engaging threaded knob can be used without departing from the scope of the present invention.

The arrangement of the adaptor plate 35 and the mounting plate 34 are designed such that when mounted to the portable power saw, the handle of the portable power saw is arranged at an easily reached position for the operator when in use. Thus, depending upon the design of the particular power saw for which the adjustable guide wheel set of the present invention is to be used, only the adaptor plate 35 has to be individually tailored to the power saw. The U-shaped wheel support frame 30 and the adjusting mechanism 34, 36 and 40 can be of a universal design for all types of commercially available portable power saws.

In use, the operator of the portable power saw (FIG. 2) is able to stand substantially upright thus reducing any strains on his back and arms. The weight of the power saw 11 is partially supported via the wheels 32 of the adjustable guide wheel set. By locating the wheels 32 at essentially the midpoint of the cut of the saw blade, i.e, in a line substantially perpendicular to the cutting surface 28 passing through the arbor of the saw blade 16, torsional twisting of the saw blade 16 is minimized during radius or curved cuts. This substantially reduces the wear on the saw blade 16 and provides a savings of repair and replacement time as well as cost for the saw blade. The wheel position of the adjustable guide wheel set further has the advantages of eliminating, or at least minimizing, any need to skid the wheels during a radius or curve cut. This again makes the power saw easier to use for the operator, resulting in a faster cutting operation and reduced time and labor costs for a particular job.

Still further, any pivoting of the power saw 11 about the pivot axis of the wheels 32 due to different heights of the operator will only have a minimal effect on the cutting depth of the saw blade 16 due to the position of the wheels 32 along the perpendicular line passing through the arbor of the saw blade 16. By increasing the uniformity of the cutting depth, excess wear on the saw blade 16 is prevented.

Figure 5:
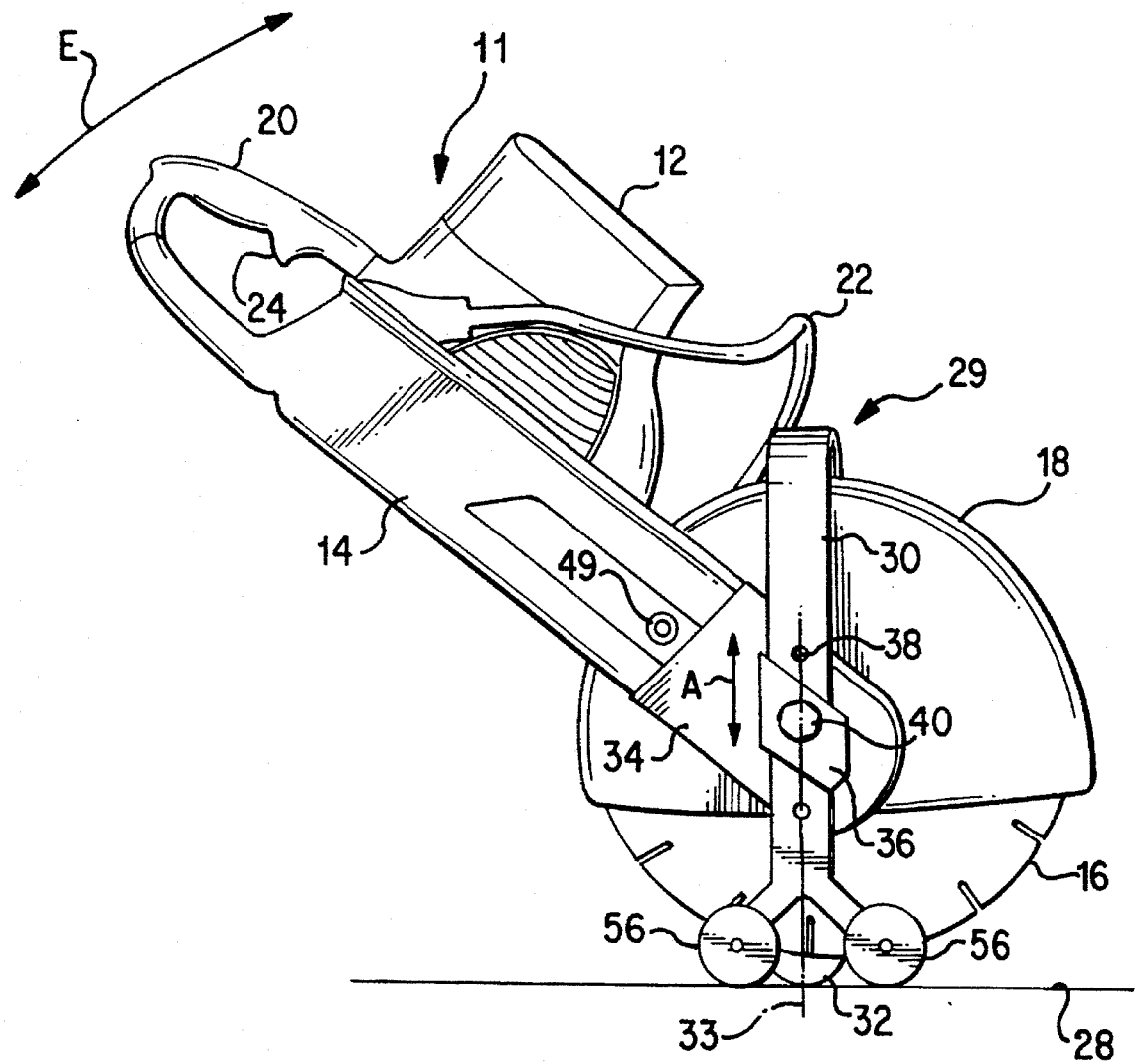
FIG. 5 is a schematic diagram of a power saw using another embodiment of the invention.

Another embodiment is shown in FIG. 5, wherein the guide 29 is provided with tandem wheels 56 on one side of the saw blade 16 and a single wheel 32 on the other side. In this embodiment, the balance point of the tandem wheels 56 is maintained directly below the arbor of the saw blade, i.e., along line 33. The use of a tandem wheel set 56 provides more stability to the operator. While the tandem wheel 56 may slide transverse to the tangent of the cutting line during a radius or curve cut, the amount of slide is kept minimal so long as the tandem wheels are located within the diameter of the saw blade as shown in FIG. 5.

Figure 6:
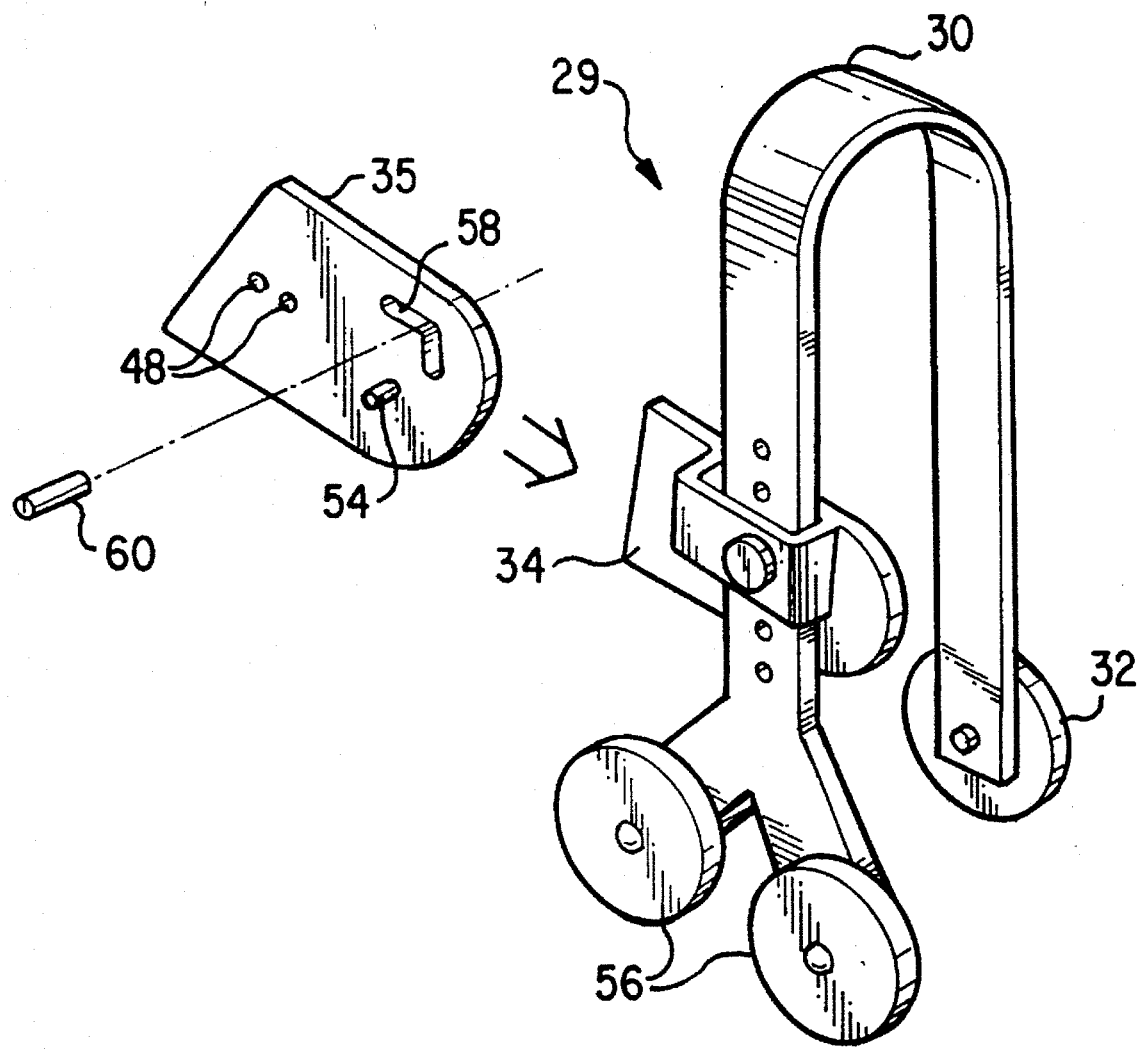
FIG. 6 is an exploded view illustrating the pin and slot connection of the adaptor plate and mounting plate.

With a tandem wheel set 56 as shown in FIG. 5, any pivoting motion (arrow E) of the power saw 11 would result in a lifting of one of the tandem wheels 56 off of the cutting surface 28. This is because of the fixed coupling between the guide wheel set 29 and the power saw 11. Alternatively, FIG. 6 illustrated an embodiment wherein the adaptor plate 35 uses a pin 54 and slot 58 connection for pivotally mounting the power saw 11 to the guide wheel set 29. In this case, a slide pin 60 engages into slot 58 thus allowing the power saw to pivot about pin 54 with respect to the wheel set 29. This prevents any lifting movement of the tandem wheels 56 when the power saw 11 is pivoted.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A guide for use with a portable power saw having a cutting tool which revolves about an arbor in order to cut a pavement or masonry surface in a cutting direction, comprising:

a set of wheels for coupling with said power saw, such that said set of wheels have a common rotation axis which is arranged in a plane substantially extending through said arbor, said plane being substantially perpendicular to said surface and to said cutting direction during a cutting operation, and further wherein said set of wheels includes at least two wheels, one of said two wheels being arranged on one side of the cutting tool, and the other wheel being arranged on the other side of the cutting wheel whereby radius cuts of said surface are facilitated.

2. A guide according to claim 1, further comprising a support frame having two legs, said one wheel being operatively connected at an end of one of said two legs and the other wheel being operatively connected at one end of the other of said two legs.

3. A guide according to claim 2, wherein said support frame has a substantially U-shape, and mounts over a blade guard and the cutting tool of the power saw.

4. A guide according to claim 1, further comprising means for adjusting the vertical height of the cutting tool relative to the wheel set.

5. A guide according to claim 4, wherein the adjusting means includes a slide mount moveable along one of said two legs of the support frame, and a fixing device for locking the slide mount at a desired position on the one leg.

6. A guide according to claim 5, wherein the slide mount attaches to the power saw.

7. A guide according to claim 6, wherein an adaptor plate is mounted to the power saw, said slide mount being connected to said adaptor plate.

8. A guide according to claim 6, wherein the fixing device includes a spring-loaded pin which is insertable into bores arranged on said one leg to lock the slide mount at the desired position.

9. A guide according to claim 7, wherein said adaptor plate is designed to fit a particular power saw, such that when the support frame and slide mount are operatively coupled to said adaptor plate, a handle of said power saw is positioned to be reachable from an operator's upright position.

10. A guide according to claim 1, wherein said set of wheels includes three wheels, one of said three wheels being arranged on one side of the cutting tool, and two of said three wheels being arranged on the other side of said cutting tool such that a balance point between said two wheels substantially lies in said plane.

11. A guide according to claim 10, wherein said power saw is pivotable with respect to the set of wheels such that said two wheels maintain contact with cutting surface during the cutting operation.

12. For use with a hand-held power tool having a tool which operates on a workpiece via rotational movement about an axis, the improvement comprising:

a support and guide mechanism coupleable to the power tool, said mechanism being disposed on both sides of said tool between a surface of the workpiece and said axis within boundary planes which extend substantially perpendicularly from the surface of the workpiece to tangential edges of said tool.

13. For use with a hand-held power tool according to claim 12, the improvement further comprising:

means for adjusting the support and guide mechanism with respect to the power tool, said adjusting means operating to raise or lower the tool with respect to said support and guide mechanism to vary the extent of operation of said tool on the surface of the workpiece.

14. For use with a hand-held power tool, according to claim 13, wherein said support and guide mechanism includes a set of wheels, at least one wheel of said set being disposed on each side of said tool.

15. For use with a hand-held power tool, according to claim 14, wherein said support and guide mechanism further includes a support frame operatively coupling said set of wheels, and wherein the adjusting means adjusts a position of the power tool relative to said support frame.

16. For use with a hand-held power tool, according to claim 15, wherein said power tool is a power saw, said tool is a circular saw blade, and said workpiece is a pavement surface.

* * * * *